United States Patent Office 3,594,479
Patented July 20, 1971

3,594,479
COMPOSITION AND METHOD FOR PREVENTING BRONCHOSPASMS USING PYRAZINE DERIVATIVES
John Anthony Maguire and Francis Leslie Rose, Macclesfield, England, assignors to Imperial Chemical Industries Limited, London, England
No Drawing. Original application Jan. 2, 1968, Ser. No. 694,816. Divided and this application Jan. 29, 1970, Ser. No. 12,534
Claims priority, application Great Britain, Feb. 3, 1967, 5,356/67
Int. Cl. A61v 27/00
U.S. Cl. 424—250        2 Claims

ABSTRACT OF THE DISCLOSURE

Novel s-triazolo[4,3-a]pyrazine derivatives bearing alkyl substituents in the pyrazine ring and an amino, hydroxy, acetamido or formamido substituent in the triazole ring, which prevent bronchospasm and are useful in the treatment of asthma.

---

This is a division of our copending application, Ser. No. 694,816, filed Jan. 2, 1968.

This invention relates to new pyrazine derivatives which prevent bronchospasm and which are therefore useful in the treatment of diseases which involve spasm or constriction of the bronchia musclature, for example asthma or bronchitis.

According to the invention we provide pyrazine derivatives of the formula:

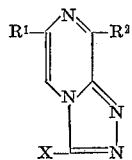

wherein R1 and R2, which may be the same or different, stand for alkyl radicals, and X stands for an amino, hydroxy formamido or acetamido radical.

It is to be understood that the pyrazine derivatives of the present invention have a skeleton ring structure of the formula:

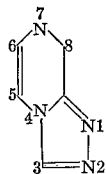

which is s-triazolo[4,3-a]pyrazine, and that this structure is numbered as shown above.

A suitable value for $R^1$ or $R^2$ is, for example, an alkyl radical of not more than 4 carbon atoms, for example the methyl or n-propyl radical.

A preferred group of pyrazine derivatives of the invention comprises those compounds wherein $R^1$ and $R^2$ stand for alkyl radicals which together contain not more than 5 carbon atoms.

As specific pyrazine derivatives of the invention there may be mentioned, for example, 3-amino-6,8-dimethyl-s-triazolo[4,3-a]pyrazine, 3-amino - 8 - methyl-6-n-propyl-s-tirazolo[4,3-a]pyrazine, 3-acetamido-6-methyl-8-n-propyl-s-triazolo[4,3-a]pyrazine, 3-amino-6-methyl-8-n-propyl-s-triazolo[4 3-a]pyrazine, 3 - hydroxy-6-methyl-8-n-propyl-s-triazolo[4,3-a]pyrazine, and 3-formamido-6-methyl-8-n-propyl-s-triazolo[4,3-a]pyrazine, and of these, the preferred compound is 3-acetamido-6-methyl-8-n-propyl-s-triazolo[4,3-a]pyrazine.

According to a further feature of the invention we provide a process for the manufacture of those of the pyrazine derivatives of the invention wherein X stands for an amino radical, which comprises the interaction of a pyrazinylhydrazine derivative of the formula:

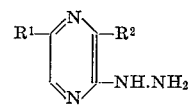

wherein $R^1$ and $R^2$ have the meanings stated above, with a cyanogen halide.

A suitable cyanogen halide is, for example, cyanogen chloride.

The above interaction may be carried out in the presence of a diluent or solvent, for example water, ethanol or ethylene dichloride, and it is preferably carried out at about ambient temperature, for example between —10° C. and 30° C. The interaction is also preferably carried out at a pH of between 4 and 9 in the presence of an acid binding agent for example an alkali metal salt of a weak acid, for example sodium hydrogen carbonate, sodium carbonate or sodium acetate.

When an acetate is used as the acid binding agent in the above process, those of the pyrazine derivatives of the invention wherein X stands for the acetamido radical are formed in addition to the pyrazine derivatives of the invention wherein X stands for an amido radical. The relative proportions of the two products wherein X stands for an acetamido radical and wherein X stands for an amino radical, and their ease of isolation, are dependent upon the precise values of $R^1$ and $R^2$.

According to a further feature of the invention we provide a process for the manufacture of those of the pyrazine derivatives of the invention wherein X stands for the acetamido radical, which comprises the interaction of a pyrazinylhydrazine derivative of the formula:

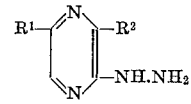

wherein $R^1$ and $R^2$ have the meanings stated above, with a cyanogen halide in the presence of a salt affording the acetate ion.

A suitable cyanogen halide is, for example cyanogen chloride, and the interaction may be carried out in a diluent or solvent, for example water or ethanol, or a mixture thereof. The interaction is preferably carried out about ambient temperature, for example between —10° C. and 30° C., and it is preferably carried out at a pH of between 4 and 9.

The above process is particularly useful for the manufacture of the pyrazine derivative of the invention wherein X stands for the acetamido radical, $R^1$ stands for the methyl radical and $R^2$ stands for the n-propyl radical.

It is surmised that in the above process, those of the pyrazine derivatives of the invention wherein X stands for the acetamido radical are produced via the intermediate formation of acetyl isocyanate, and thus according to a further feature of the invention, we provide a process for the manufacture of those of the pyrazine derivatives of the invention wherein X stands for the actamido radical, which comprises the interaction of a pyrazinylhydrazine derivative of the formula:

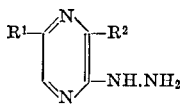

wherein $R^1$ and $R^2$ have the meanings stated above, with acetyl isocyanate.

According to a further feature of the invention we provide a process for the manufacture of those of the pyrazine derivatives of the invention wherein X stands for the formamido or acetamido radical, which comprises the interaction of an amino compound of the formula:

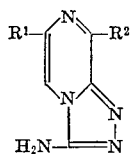

wherein $R^1$ and $R^2$ has the meanings stated above, with an acylating agent derived from formic or acetic acid.

As a suitable acylating agent there may be mentioned, for example, acetyl chloride or acetic anhydride, or acetic or formic acid together with a condensing agent, for example dicyclohexylcarbodi-imide.

According to a further feature of the invention we provide a process for the manufacture of those of the pyrazine derivatives of the invention where X stands for a hydroxy radical, which comprises the interaction of a pyrazinylhydrazine derivative of the formula:

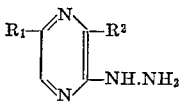

wherein $R^1$ and $R^2$ have the meanings stated above, with a reaction ester or halogeno compound derived from carbonic acid, followed, if necessary by treatment of the initial product with a base.

A suitable reactive ester of halogeno compound derived from carbonic acid is, for example, a lower alkyl ester of chloroformic acid, for example ethyl chloroformate, or carbonyl chloride.

It is to be understood that when a lower alkyl ester of chloroformic acid is used in the above process, it is necessary to treat the initial reaction product with a base, for example sodium hydroxide, in order to obtain a pyrazine derivative of the invention wherein X stands for an hydroxyl radical.

The pyrazinylhydrazine derivative used as starting materials in the above processes may be obtained by the interaction of the corresponding halogenopyrazine derivatives, for example the corresponding chloropyrazine derivatives, with hydrazine, and the halogenopyrazine derivatives themselves may be obtained by the interaction of the corresponding hydroxypyrazine derivatives with a phosphorus oxyhalide, for example phosphorus oxychloride.

The pyrazine derivatives of the invention may be used in the form of pharmaceutical compositions and therefore according to a further feature of the invention we provide pharmaceutical compositions comprising at least one pyrazine derivative of the invention together with a pharmaceutically-acceptable, diluent or carrier.

The pharmaceutical compositions may be in a form suitable for oral administration, for example tablets, capsules, syrups or linctuses, or they may be in a form suitable for parenteral administration, for example sterile injectable aqueous solutions. These composition may contain conventional excipients and may be manufactured by conventional techniques. It should be noted, however, that while the pyrazine derivatives of the invention are not themselves soluble in water, satisfactory aqueous solutions may be obtained by adjustment of the pH of the aqueous phase. Thus, for those pyrazine derivatives of the invention wherein X stands for an acetamido radical, a satisfactory solution is obtained if the pH of the aqueous phase is adjusted to between 8 and 9.

The pyrazine derivatives of the invention may be administered to patients together with other compounds which are known to prevent bronchospasm. Such other compounds are, for example, aminophylline which is administered orally or by injection, ephedrine which is administered orally, sympathomimetic amines, for example isoprenaline or adrenaline which are administered as aerosols, or those corticosteroids which are used to control asthma, for example prednisolone.

The pyrazine derivatives of the invention may also be administered together with a selective $\beta$-adrenergic blocking agent, for example 1-(4-acetamidophenoxy)-3-isopropylamino-2-propanol, which will inhibit any sympathomimetic action of the pyrazine derivative on the heart but not affect the action of the pyrazine derivative on the bronchial musclature. Since the pyrazine derivatives of the invention possess only weak sympathomimetic activity, it is expected that administration together with a selective $\beta$-adrenergic blocking agent will only be useful when the pyrazine derivatives have to be administered at high doses.

The invention is illustrated but not limited by the following examples in which the parts are by weight:

EXAMPLE 1

2.5 parts of 2-hydrazino-3,5-dimethylpyrazino are dissolved in 30 parts of water containing 3.8 parts of anhydrous sodium acetate and 1.8 parts of glacial acetic acid. A stream of cyanogen chloride is bubbled through the solution, which is maintained at 10° C., until 1.55 parts of the gas are absorbed. The suspension so formed is allowed to stand at 0° C. for one hour, then it is filtered and the collected solid is washed with water. After drying at 50° C., it is crystallised from ethanol, and there is thus obtained 3-amino-6,8-dimethyl-s-triazolo[4,3-a]pyrazine, as a colourless crystalline solid, M.P. 230-232° C.

EXAMPLE 2

2.5 parts of 2-hydrazino-3-methyl-5-n-propylpyrazine are dissolved in 50 parts of water containing 3.1 parts of anhydrous sodium acetate. A stream of cyanogen chloride is bubbled through the solution, which is maintained at 0° C. until 1 part of the gas has been absorbed. The suspension is maintained at 0° C. for 2 hours, then evaporated to dryness in vacuo at 50° C. The solid residue is treated with 3 separate portions, each of 75 parts, of boiling ethyl acetate, decanting each portion from the insoluble residue. The combined extracts are evaporated to dryness, and the residue is crystallised from ethyl acetate. There is thus obtained 3-amino-8-methyl-6-n-propyl-s-triazolo[4,3-a]pyrazine as a pale yellow crystalline solid, M.P. 216-217° C.

EXAMPLE 3

One part of 2-hydrazino-5-methyl-3-n-propylpyrazine is warmed into solution in 15.6 parts of ethanol containing 1.9 parts of 5 N acetic acid. A solution of 1.25 parts of anhydrous sodium acetate in 6.5 parts of water is added, and a stream of cyanogen chloride bubbled through the solution (which is maintained at 0° C.) until 0.6 part of the gas are absorbed. The resulting solution is sealed and allowed to stand for 4 hours at 0° C. The suspension is filtered, and the collected solid washed with water, then with a little ethanol. The filtrate is retained. The solid is dried at 50° C., and then crystallised from n-butanol. There is thus obtained 3-acetamido-6-methyl-8-n-propyl-s-triazolo[4,3-a]pyrazine as a colourless crystalline solid, M.P. 264–265° C.

The filtrate retained above is concentrated, and the pH adjusted to 8 with ammonia. The resulting solution is extracted 5 times, each time using 40 parts of ether. The extracts are combined, dried and evaporated, and the residue is dissolved in hot benzene. The benzene solution is added to an alumina column which is then eluted with a 25% solution of ethanol in benzene. The eluate is evaporated, and the residue is recrystallised from dioxan in the presence of a little carbon. There is thus obtained 3-amono-6-methyl-8-n-propyl-s-triazolo[4,3 - a]pyrazine as pale yellow needles, M.P. 199–200° C.

EXAMPLE 4

A solution of 3.2 parts of anhydrous sodium acetate in 9 parts of water is added to a solution of 2 parts of 2-hydrazino-5-methyl-3-n-propylpyrazine and 2 parts of glacial acetic acid in 25 parts of ethanol. The mixture is warmed until all the solid has dissolved, and then it is cooled to 0° C. A stream of phosgene is passed through the solution for 10 minutes, and the pH is maintained at 5 by the addition of anhydrous sodium acetate. The mixture is then evaporated at 50° C., and the residue is suspended in 60 parts of 0.5 N sodium hydroxide solution. The resulting suspension is heated for 5 minutes at 50° C., then cooled to 0° C., and the supernatant liquid is decanted from an oily residue. This liquid is treated with carbon, filtered and the filtrate acidified with glacial acetic acid. The precipitated solid is filtered off, washed, dried and recrystallised from methanol. There is thus obtained 3-hydroxy-6-methyl-8-n-propyl-s-triazolo[4,3-a]pyrazine as pale yellow crystals, M.P. 183–184° C.

EXAMPLE 5

7.3 parts of 2 - hydrazino-5-methyl-3-n-propylpyrazine are dissolved in a mixture of 50 parts of ethylene dichloride and 25 parts of water. A stream of cyanogen chloride is bubbled into the solution which is maintained at 25–30° C. The pH of the reaction mixture is kept at 7–8 by addition of solid sodium carbonate as necessary. The completion of the reaction is shown by the absence of a blue colouration when a sample of the reaction mixture is shaken in air with a mixture of aqueous sodium hydroxide and methyl alcohol. The pale yellow solid which forms is collected, and washed with water and ethylene dichloride. After recrystallisation from dioxan there is thus obtained 3 - amino - 6 - methyl-8-n-propyl-s-triazolo[4,3-a] pyrazine as pale yellow needles, M.P. 199–200° C.

EXAMPLE 6

4.1 parts of 3-amino - 6 - methyl-8-n-propyl-s-triazolo-[4,3-a]pyrazine and 6.5 parts of acetic anhydride are heated at 90–100° C. for 10 minutes. 10 parts of methyl alcohol are then added and the resultant suspension is filtered. Recrystallisation of the solid from n-butanol gives 3 - acetamido-6-methyl-8-n-propyl-s-triazolo[4,3-a] pyrazine as colourless needles, M.P. 264–265° C.

EXAMPLE 7

A solution of 13.3 parts of dicyclohexylcarbodiimide in 120 parts of dry ethyl acetate was mixed with a solution of 4,1 parts of 3 - amino-6-methyl - 8 - n-propyl-s-triazolo-[4,3-a]-pyrazine in 80 parts of dry ethyl acetate and 3 parts of anhydrous formic acid. The suspension thus obtained is stirred at 25° C. for 42 hours and then filtered. The solid collected is washed with ethyl acetate. The combined filtrate and washings are evaporated to dryness and the pale yellow solid residue is stirred in 40 parts of water with the addition of sufficient sodium hydroxide to make the mixture strongly alkaline. The suspension is filtered and the filtrate is made neutral by the addition of acetic acid. The colourless precipitate of 3-formamido-6-methyl - 8 - n - propyl-s-triazolo[4,3-a]pyrazine thus formed, recrystallised from water as colourless needles, M.P. 183–184° C.

EXAMPLE 8

A solution of 3.5 parts of ethyl chloroformate in 15 parts of ethyl acetate is added slowly to a stirred solution of 5.1 parts of 2-hydrazino-5-methyl-3-n-propylpyrazine in 50 parts of ethyl acetate. The reaction temperature is maintained at 20–25° C. After 1 hour, the resultant suspension is filtered. The solid is dissolved in 35 parts of water and neutralised by the addition of sodium acetate. The yellow precipitate which forms is collected and recrystallised from cyclohexane to give 2-ethoxy-carbonyl-5-methyl-3-n-propylpyrazine, M.P. 97–98° C. 2 parts of this compound are heated at the boil for 5 minutes in 20 parts of water and 3 parts of a 40% solution in water of sodium hydroxide. The solution which forms is stirred with charcoal and filtered. The filtrate is adjusted to pH 5 by addition of acetic acid. The precipitate which forms is collected and recrystallised from methanol to give 3-hydroxy-6-methyl-8-n-propyl - s - triazolo[4,3-a]pyrazine as pale yellow needles, M.P. 183–184° C.

EXAMPLE 9

A mixture of 25 parts of 3-acetamido-6-methyl-8-n-propyl-s-triazolo[4,3-a]pyrazine, 65 parts of maize starch, 130 parts of calcium phosphate and 1 part of magnesium stearate is compressed and the compressed mixture is then broken down into granules by passage through a 16-mesh screen. The resultant granules are then compressed into tablets using the conventional techniques.

The pyrazine derivatives of the invention prevent bronchospasm as illustrated by their action in preventing the death of guinea-pigs exposed to a histamine aerosol. This action is commonly used as a standard test for such activity. [Loew, E. R., Kaiser, M. E. and Moore, V. (1945). J. Pharmacol. and Experimental Therapeutics, 83, 120].

The pyrazine derivatives also show bronchodilator activity when tested on an artificially respired, perfused guinea-pig lung preparation. [Bhattacharya, B. K. and Delaunois, A. L. (1955). Arch. Int. Pharmaoodyn., 101, 495].

The preferred pyrazine derivative of the invention also relaxes an isolated guinea-pig trachea which has been constricted by acetyl choline, 5-hydroxytryptamine or bradykinin, and it has no specific antihistamine activity when tested on an isolated guinea-pig ileum constricted with histamine.

A well-known feature of asthma is spasm of the bronchial musclature which results in dyspnoea, and relief is afforded by known drugs, for example aminophylline, which prevent bronchospasm. Accordingly, like aminophylline, the pyrazine derivatives of the invention are also useful for the treatment of asthma, but differ from aminophylline in being considerably more potent than aminophylline.

When used for the treatment of asthma a typical dose of pyrazine derivative is in the range 25 to 200 mg. per man, preferably in the range 50 to 100 mg. per man, administered orally or by injection at intervals as required by the patient depending upon the risk of an asthmatic attack.

The dose of pyrazine derivative is conveniently administered orally in the form of tablets or capsules containing between 10 and 50 mg. of pyrazine derivative, or in the form of a measured amount of a syrup or linotus. The dose of pyrazine derivative may be administered parenterally in the form of an injectable aqueous solution containing between 100 and 200 mg. per ml.

What we claim is:
1. A pharmaceutical composition in unit dosage form for the prevention of bronchospasm, said composition comprising an effective amount of a pyrazine derivative of the formula:

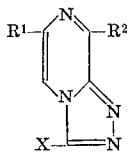

wherein $R^1$ and $R^2$ are alkyl of 1–4 carbon atoms, and X is selected from the group consisting of amino, hydroxy, formamido and acetamido, together with a pharmaceutically-acceptable carrier.

2. A method of preventing bronchospasm which comprises administering to a host subject to bronchospasm, an effective dose of a pyrazine derivative of the formula:

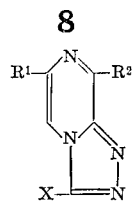

wherein $R^1$ and $R^2$ are alkyl of 1–4 carbon atoms, and X is selected from the group consisting of amino, hydroxy, formamido and acetamido.

References Cited

Conn, Current Therapy, 1970, p. 506.

STANLEY J. FRIEDMAN, Primary Examiner

U.S. Cl. X.R.

260—250